(12) United States Patent
Coutu et al.

(10) Patent No.: US 6,879,128 B2
(45) Date of Patent: Apr. 12, 2005

(54) METHOD AND APPARATUS FOR INDEPENDENTLY CONTROLLING EACH PHASE OF A MULTI-PHASE STEP MOTOR

(75) Inventors: David Coutu, East Hampton, CT (US); Robert A. Fournier, Newington, CT (US)

(73) Assignee: IMS Inc., Marlborough, CT (US)

( * ) Notice: Subject to any disclaimer, the term of this patent is extended or adjusted under 35 U.S.C. 154(b) by 0 days.

(21) Appl. No.: 10/628,122

(22) Filed: Jul. 28, 2003

(65) Prior Publication Data

US 2005/0024007 A1 Feb. 3, 2005

(51) Int. Cl.[7] .............................................. G05B 19/40
(52) U.S. Cl. ....................... 318/685; 318/696; 318/254; 318/138; 318/439; 318/599; 318/811; 363/76; 363/95; 363/97; 363/98
(58) Field of Search ................................ 318/685, 696, 318/254, 139, 439, 599, 811, 432; 363/76, 95, 97, 98

(56) References Cited

U.S. PATENT DOCUMENTS

| | | | | | |
|---|---|---|---|---|---|
| 4,984,647 A | * | 1/1991 | Morishita et al. | ............ | 180/446 |
| 5,343,382 A | * | 8/1994 | Hale et al. | ..................... | 363/98 |
| 5,457,364 A | * | 10/1995 | Bilotti et al. | ................ | 318/434 |
| 5,650,705 A | * | 7/1997 | Hart | ............................ | 318/635 |
| 5,818,178 A | * | 10/1998 | Marumoto et al. | .......... | 318/254 |
| 5,886,484 A | * | 3/1999 | Fucili et al. | ................. | 318/254 |
| 5,952,856 A | * | 9/1999 | Horiguchi et al. | .......... | 327/110 |
| 6,049,184 A | * | 4/2000 | Uggla et al. | ................ | 318/434 |

* cited by examiner

Primary Examiner—Rina Duda

(57) ABSTRACT

The current in each phase of a multi-phase step motor is monitored and the excess phase current above the set point current, as required on a cycle-by-cycle PWM basis, is reduced thereby bringing each phase current down to the set point. The PWM frequency is automatically adjusted to maintain a minimum number of PWM edges within a portion of the current waveform. A maximum charge/discharge time is specified as a percentage of the PWM period. These provide an accurate independent current control within each phase of a multiphase step motor.

10 Claims, 1 Drawing Sheet

METHOD AND APPARATUS FOR INDEPENDENTLY CONTROLLING EACH PHASE OF A MULTI-PHASE STEP MOTOR

BACKGROUND OF THE INVENTION

When operating a multi-phase step motor, the phase current to the motor must be accurately controlled to cause motor movement as well as to hold the motor position when stopped. The degree of control impacts stability while in motion and positional accuracy when stationary. One such method for controlling the operation of a stepper motor is described within U.S. Pat. No. 5,264,770 entitled "Stepper Motor Driver Circuit". Other methods for controlling multi-phase step motors are found within U.S. Pat. No. 5,650,705 entitled "Apparatus and Method for Controlling Currents in an Inductor" and U.S. Pat. No. 6,049,184 entitled "Method and Arrangement for Controlling a Current".

Such methods often utilize a fixed frequency pulse width modulator "PWM" consisting of a single comparator for each phase to determine when the phase current is at or above a set point. However, when the motor is moving at high speed the condition of excess current caused by back electromotive force, "EMF", is difficult to determine such that the "PWM" frequency may not provide sufficient opportunity to control the motor current and there is no provision to stop the motor current based on a time factor.

One purpose of the present invention is to control the motor current independently in each motor phase of a multi-phase step motor to a set current value.

SUMMARY OF THE INVENTION

The current in each phase of a multi-phase step motor is monitored and the excess phase current above the set point current, as required on a cycle-by-cycle PWM basis, is reduced thereby bringing each phase current down to the set point. The active independent removal of excess phase current caused by back EMF allows accurate current control at higher motor operating speeds and reduces phase lag. The PWM frequency is automatically adjusted to maintain a minimum number of active edges within the specified upper frequency limit during the front slope portion of the current waveform when the step motor is in motion. Automatic adjustment of PWM frequency above the base frequency provides more accurate construction of the current waveform at higher motor speeds. A maximum charge/discharge time is specified as a percentage of the PWM period. Controlling the maximum charge and discharge time provides a further benefit as it can be used to compensate for extremes in system response caused by very low inductance motors and/or very high motor supply voltage. These provide accurate independent current control within each phase of a multiphase step motor.

DESCRIPTION OF THE PREFERRED EMBODIMENT

Figure 1:
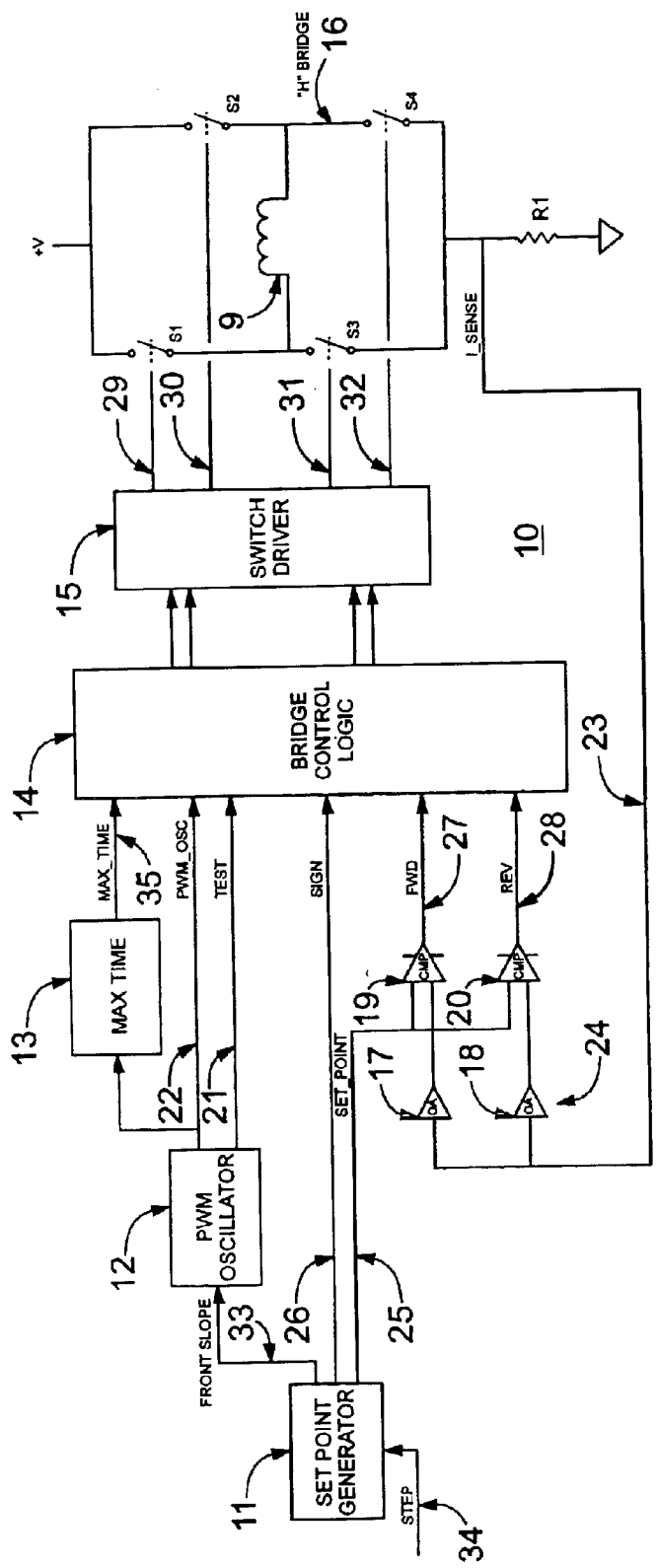
FIG. 1 is a diagrammatic representation of the step motor driver circuit in accordance with the teachings of the invention.

As shown in FIG. 1, one motor phase coil 9 of a multiphase motor (not shown) is interconnected with the driver circuit 10 by means of an H bridge switch arrangement, hereafter "H bridge" 16 consisting of switches S1–S4, similar to that shown in the aforementioned U.S. Pat. No. 6,049,184 for individual control of each separate motor phase. Although only one motor phase coil 9 is depicted, it is understood that the driver circuit 10 connects in a similar manner with the other motor phase coils (not shown).

By activating the appropriate switches S1–S4 current can be directed through the phase coil 9 in different directions. In accordance with the teachings of the invention, FORWARD CURRENT "FWD" is defined herein as increasing current away from zero. REVERSE CURRENT "REV" is defined as decreasing current toward zero. To achieve FWD current or REV current one switch in the upper portion and one switch in the lower portion of the H bridge are activated.

RECIRCULATING CURRENT "RECIRC" is defined as allowing current to move within the upper or lower portion of the H bridge 16 when FWD or REV current has been terminated. To achieve RECIRC current, both switches in the lower portion or both switches in the upper portion of the H bridge are activated. The signals that define the direction of current flow are SIGN and TEST.

In operation, a PWM oscillator 12 creates the TEST signal (item 37, FIG. 2) onto conductor 21 and PWM_OSC signal (item 36, FIG. 2) onto conductor 22 which direct the bridge control logic 14 to assert the appropriate switches S1–S4 in the H bridge 16. Phase current is sensed during FWD and REV across resistor R1 creating an I_SENSE signal on conductor 23 which is conditioned by signal conditioning circuit 24, consisting of paired op amps 17, 18 and then compared to the SET_POINT signal generated on conductor 25 by the set point generator 11, using the paired comparators 19, 20. The comparators 19, 20 create two signals, FWD on conductor 27, which indicates that FWD current is at or above the SET_POINT during the forward condition, and REV on conductor 28, which indicates that the REV current is at or above the SET_POINT during the reverse condition.

The set point generator 11 provides the SIGN signal on conductor 26, SET_POINT signal on conductor 25 and FRONT_SLOPE signal on conductor 33 in response to the STEP signal entered on input 34. The FRONT_SLOPE signal on conductor 33 occurs when the SIGN signal is present on conductor 26 and the SET_POINT signal on conductor 25 is increasing in response to the STEP signal on input 34 for one quarter of a cycle.

Figure 2:
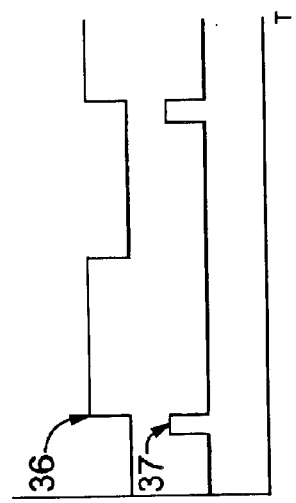
FIG. 2 is a diagrammatic representation of the PWM oscillator waveform and TEST waveform within the step motor driver circuit of FIG. 1.

The PWM_OSC signal waveform 36 and the TEST signal waveform 37 are shown in FIG. 2 as a function of time.

While the TEST signal is present on conductor 21, the bridge control logic 14 activates the switches S1–S4 in the H bridge via switch driver 15 and conductors 29–32 to cause the phase current to flow in the REV direction. At the PWM_OSC edge 36, the bridge control logic 14 switches to FWD phase current or continues to provide REV phase current depending on the FWD and REV signal levels. If REV signal is not present, the bridge control logic 14 activates the H bridge 16 for FWD phase current until FWD signal is present indicating the I_SENSE signal on conductor 23 has risen to the SET_POINT. Phase current will then RECIRC. If REV signal is present at the PWM_OSC edge 36, the phase current is above the SET_POINT and the bridge control logic 14 will maintain the REV phase current condition until the REV signal on conductor 28 ceases thereby indicating that the I-SENSE signal on conductor 23 has decreased to the SET_POINT. Phase current will then RECIRC.

During stationary and low speed motor operation, it is not generally required to remove excess phase current. However during high-speed motor operation when the SET_POINT is rapidly decreasing, back EMF causes the motor phase current to be above the SET_POINT requiring the active removal of phase current, as described earlier, for substantial improvement in current control operation. It is to be noted the other motor phases can use the same PWM-OSC edge or the other PWM-OSC edge.

The PWM oscillator 12 adjusts the frequency of the PWM_OSC signal on conductor 22 when there are fewer than a specified number of PWM_OSC edges present during the input of the FRONT_SLOPE signal to the PWM oscillator 12. If the PWM oscillator 12 counts less than the specified number of PWM_OSC edges during the occasion of the FRONT_SLOPE signal, the PWM oscillator 12 frequency is increased by a fixed amount when the FRONT_SLOPE signal ceases. This will occur during each FRONT_SLOPE signal occurrence until there are the minimum specified number of PWM_OSC edges present or the preset maximum frequency within the PWM oscillator is reached, whichever occurs first, to thereby maintain a minimum number of PWM_OSC edges during the quarter cycle while the motor is in operation or until the maximum operating frequency of the PWM oscillator 12 is achieved. It is to be noted that the counting of PWM_OSC edges to thereby accurately control the motor phase current during high-speed motion could be performed during any portion of the motor operating cycle.

The max time logic 13 connects between the PWM oscillator 13 and the bridge control logic 14 to create a MAX_TIME signal on conductor 35 that occurs after the designated percentage of the PWM_OSC signal period has elapsed. The period timing begins with the edge of the PWM oscillator 36. When MAX_TIME signal occurs, the bridge control logic 14 will discontinue either the FWD or REV phase current, if required, placing the H bridge into the RECIRC condition. While in the RECIRC condition, MAX-TIME has no effect during the TEST period 37. It is to be noted that the other motor phases can use the same PWM-OSC edge or the other PWM-OSC edge.

What is claimed is:

1. A motor driver circuit comprising:
   An H-switch circuit arranged for connection with each phase of a multi-phase step motor;
   a switch driver interconnected with said H-switch and a bridge control circuit;
   a set point generator connecting with said bridge control circuit and said H-switch circuit for removal of excess phase current from said multi-phase step motor;
   a step input to said set point generator for providing a set point current value to said set point generator;
   a pair of operational amplifiers and a pair of comparators interconnected together and with said bridge control circuit, said operational amplifiers being connected with said H-switch in feed back circuit arrangement;
   a phase current sensing resistor connecting with inputs to said operational amplifiers for providing a sensing current value to said operational amplifiers;
   an output of one of said comparators connects with said bridge control circuit to provide a forward current to said bridge control circuit and;
   an output of another of said comparators connects with said bridge control circuit to provide a reverse current to said bridge control circuit;
   whereby current in each phase of said multi-phase step motor is monitored and excess current above said set point current value is reduced thereby bringing current in said each phase down to said set point current value.

2. The motor driver circuit of claim 1 including means connecting between said point generator and said bridge control circuit for providing a sign current value to said bridge circuit.

3. The motor driver circuit of claim 1 wherein said H-switch circuit includes a pair of upper switches and a pair of lower switches, wherein said one phase of said multi-phased stepper motor is connected in parallel with upper and lower switches.

4. The motor driver circuit of claim 1 including a PWM oscillator connecting with said set point generator and said bridge control circuit for providing a test current value to said bridge control circuit.

5. The motor driver circuit of claim 4 wherein said PWM oscillator further provides PWM oscillator timing value to said bridge control circuit.

6. The motor driver circuit of claim 1 further including a step input to said set point generator for providing a set point current value to said bridge control circuit.

7. The motor driver circuit of claim 4 further including a max time circuit connecting with said PWM oscillator and said bridge control circuit for providing a maximum on time value to said PWM bridge control circuit.

8. The motor driver circuit of claim 6 wherein said set point generator provides a wave front slope value to said PWM oscillator.

9. A method for removing excess phase current from a stepper motor comprising the steps of: determining an amount of current in each phase of a multiphase stepper motor;
   comparing motor current in said each phase to a predetermined test current value; and
   reversing direction of motor current in said each phase to reduce said each phase motor current to the test current value,
   whereby current in said each phase of multi-phase step motor is monitored and excess current above said test current value is reduced thereby bringing current in said each phase down to said test current value.

10. A method for controlling phase current in a stepper motor comprising the steps of: determining pulse width modulation frequency associated with current in each phase of a multiphase stepper motor;
    determining a maximum pulse width modulation frequency; and
    adjusting said pulse width modulation frequency for said each phase current to a value less than said maximum pulse width modulation frequency.

* * * * *